United States Patent
Givental et al.

(10) Patent No.: US 11,620,481 B2
(45) Date of Patent: Apr. 4, 2023

(54) DYNAMIC MACHINE LEARNING MODEL SELECTION

(71) Applicant: International Business Machines Corporation, Armonk, NY (US)

(72) Inventors: Gary I. Givental, Bloomfield Hills, MI (US); Aankur Bhatia, Bethpage, NY (US); Joel Rajakumar, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 16/801,686

(22) Filed: Feb. 26, 2020

(65) Prior Publication Data
US 2021/0264025 A1 Aug. 26, 2021

(51) Int. Cl.
*G06K 9/62* (2022.01)
*G06F 21/55* (2013.01)
*G06F 8/65* (2018.01)
*G06N 20/20* (2019.01)

(52) U.S. Cl.
CPC ............ *G06K 9/6267* (2013.01); *G06F 8/65* (2013.01); *G06F 21/554* (2013.01); *G06K 9/6256* (2013.01); *G06N 20/20* (2019.01)

(58) Field of Classification Search
CPC .... G06K 9/6267; G06K 9/6256; G06N 20/20; G06F 21/554; G06F 8/65
See application file for complete search history.

(56) References Cited

U.S. PATENT DOCUMENTS

| | | | |
|---|---|---|---|
| 8,904,531 B1 * | 12/2014 | Saklikar | H04L 63/1416 726/25 |
| 10,095,866 B2 | 10/2018 | Gong et al. | |
| 10,148,677 B2 | 12/2018 | Muddu et al. | |
| 11,200,449 B1 * | 12/2021 | Ulammandakh | G06K 9/623 |
| 11,227,047 B1 * | 1/2022 | Vashisht | G06F 21/552 |
| 11,361,421 B1 * | 6/2022 | Ulammandakh | G06K 9/6267 |
| 2009/0300173 A1 | 12/2009 | Bakman et al. | |
| 2015/0033341 A1 | 1/2015 | Schmidtler et al. | |
| 2016/0078229 A1 | 3/2016 | Gong et al. | |
| 2016/0110657 A1 | 4/2016 | Gibiansky et al. | |
| 2017/0026391 A1 | 1/2017 | Abu-Nimeh | |
| 2017/0063908 A1 * | 3/2017 | Muddu | G06F 3/04847 |

(Continued)

OTHER PUBLICATIONS

Bhamare, Deval et al., "Feasibility of Supervised Machine Learning for Cloud Security", 2016 International conference on Information Science and Security (ICISS), IEEE, Dec. 19, 2016, 5 pages.

(Continued)

*Primary Examiner* — Mia M Thomas
(74) *Attorney, Agent, or Firm* — Stephen J. Walder, Jr.; Jeffrey S. LaBaw

(57) ABSTRACT

A machine learning model selector is provided. A set of machine learning (ML) models are trained based on a first training dataset. The set of trained ML model is executed on a second training dataset to generate a corresponding output for a set of data instances in the second training dataset. For each data instance in the set of data instances, a corresponding ranking of ML models is generated based on the corresponding output for the data instance generated by the set of ML models. A ML model selector is trained based on the data instances in the set of data instances and the corresponding ranking of ML models, to select a trained ML model based on an input data instance.

20 Claims, 5 Drawing Sheets

(56) References Cited

U.S. PATENT DOCUMENTS

| | | | |
|---|---|---|---|
| 2017/0223036 A1 | 8/2017 | Muddu et al. | |
| 2017/0330205 A1* | 11/2017 | Belanger | G06Q 30/0201 |
| 2018/0159876 A1* | 6/2018 | Park | H04L 63/1425 |
| 2018/0367561 A1 | 12/2018 | Givental et al. | |
| 2019/0130009 A1* | 5/2019 | McLean | G06F 16/254 |
| 2019/0260780 A1 | 8/2019 | Dunn et al. | |
| 2019/0340684 A1* | 11/2019 | Belanger | G06N 7/005 |
| 2019/0347578 A1 | 11/2019 | Bolding et al. | |
| 2019/0391956 A1* | 12/2019 | Kozhaya | G06F 16/3329 |
| 2020/0159926 A1* | 5/2020 | Lorch | G06F 21/554 |
| 2021/0279644 A1* | 9/2021 | Givental | G06K 9/6259 |
| 2021/0281592 A1* | 9/2021 | Givental | G06N 20/10 |
| 2021/0374186 A1* | 12/2021 | Miller | G06N 20/20 |
| 2021/0374187 A1* | 12/2021 | Miller | G06F 16/90344 |
| 2021/0374188 A1* | 12/2021 | Miller | G06N 20/00 |

OTHER PUBLICATIONS

Britt, Jr., Alceu S. et al., "Dynamic selection of classifiers—A comprehensive review", Pattern Recognition (2014), http://dx.doi.org/10.1016/j.patcog.2014.05.003, 17 pages.

Cruz, Rafael M. et al., "META-DES: A Dynamic Ensemble Selection Framework using Meta-Learning", Preprint submitted to Elsevier Oct. 3, 2018, arXIV: 1810.01270v1 [cs.LG], Sep. 30, 2018, 29 pages.

Mustafa, Ahmad M., "Novel Class Detection and Cross-Lingual Duplicate Detection Over Online Data Stream", Dissertation, The University of Texas at Dallas, May 2018, 136 pages.

* cited by examiner

DYNAMIC MACHINE LEARNING MODEL SELECTION

BACKGROUND

The present application relates generally to an improved data processing apparatus and method and more specifically to mechanisms for dynamic machine learning model selection, and in some illustrative embodiments, mechanisms for dynamic machine learning model selection for cybersecurity threat dispositioning.

Enterprise security is a complex problem requiring the coordination across security policies, controls, threat models and threat detection scenarios (use cases). The implementation of these policies, models and controls requires extensive use of threat monitoring technologies, security devices and resources that have security, business, and technical skills. The ever increasing number of threats at scale requires automation in support of analysts responsible for preventing, detecting and responding to these threats. In most cases, the analyst must manually search through a wide range of data sources (some private, many public), review past threat events and how they were handled, check for duplicate events, currently open similar events and the knowledge database on the appropriate response procedures to handle this information. This data collection, analysis process, and determining the final disposition of the alert is time consuming and tedious for an analyst.

There are a variety of tools that exist for threat monitoring to analyze a wide range of data sources including; structured data, unstructured data, semi-structured data, and reference data to identify patterns that are indicative of threats, security policy, and control anomalies. When these threats and/or anomalies are detected, "actionable" alerts are created. In many cases, the number of alerts exceeds the capacity of the security analyst to effectively and efficiently handle the alerts. The Security Operations Center (SOC) analysts are responsible for this process, and this is typically done by taking a closer look at the raw data associated with the alert including a review of both the contextual data and "raw" data from the data sources that triggered the alert. This data collection and investigation is time-consuming and requires complex correlation analysis. The correlation of facts can include information that is general to the threat or anomaly, but it can require very specific information about the customer, their assets, and any other special instructions the customer may have provided regarding the proper handling of the alert for a specific client. Additionally, the security analyst may often need to do additional research to understand the nature of the threat, the vector of the attack, and discern whether the target is truly vulnerable.

Only once all known factors are considered, the security analyst must determine the optimal disposition for a specific alert. There are a range of possible dispositions including but not limited to: duplicate, false positive, currently open case, new case (first of a kind), and known alert. For each of these dispositions, there are a range of actions that the analyst can recommend including: closing the alert with no further action, holding the alert for further investigation, escalating the alert for additional review, and the like. In each of these cases, the analyst may be able to recommend the specific mitigation and remediation activities that are needed to deal with the alert.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the memory comprising instructions executed by the at least one processor to cause the at least one processor to execute the method to train a machine learning model selector and implement the machine learning model selector to select a trained machine learning model to process an input data instance. The method comprises training a set of machine learning models based on a first training dataset to generate a plurality of trained machine learning models. The method also comprises executing the set of trained machine learning models on a second training dataset to generate a corresponding output for a set of data instances in the second training dataset. The method further comprises generating, for each data instance in the set of data instances, a corresponding ranking of machine learning models in the set of machine learning models based on the corresponding output for the data instance generated by the machine learning models in the set of machine learning models. IN addition, the method comprises training a machine learning model selector, based on the set of data instances in the second training dataset and the corresponding ranking of machine learning models for each of the data instances in the set of data instances, to select a trained machine learning model, from the set of trained machine learning models, based on an input data instance. Moreover, the method comprises selecting, by the machine learning model selector, for a new input data instance, a trained machine learning model from the set of trained machine learning models.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
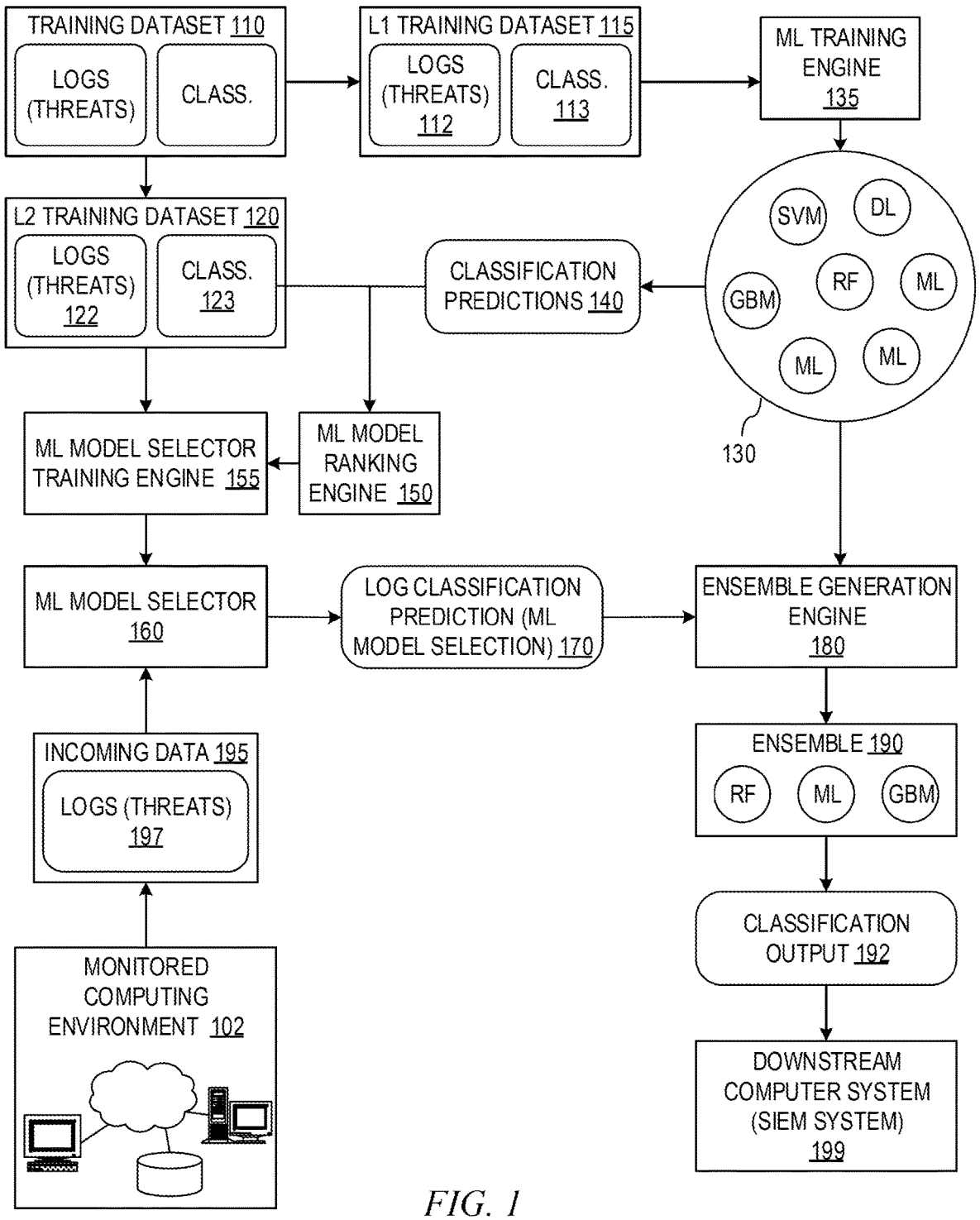
FIG. 1 is an example block diagram illustrating an operation of the primary operational elements of an improved computing tool according to one illustrative embodiment.

Detecting anomalies plays an important role in security management of modern computer system environments. Telemetry data, i.e. data collected at remote points with subsequent automatic transmission of the data to receiving equipment for monitoring, emitted by various security and endpoint computing devices is often used for such anomaly detection, where this data is often packaged as computer system log data structures, or entries into computer system log data structures (also referred to simply as "computer system logs" or just "logs").

To perform such anomaly detection, as described previously, human security analysts review the computer system logs, for example, via a Security Information and Event Management (SIEM) computing system, such as the IBM QRadar™ SIEM computing system available from International Business Machines (IBM) Corporation of Armonk, N.Y., using a rule engine and search mechanism. This manual process may operate well for small sized enterprises and managed security services providers (MSSPs), however with the increasing volume of data traffic associated with computing resources, there is an explosive growth of computer system log volumes making it impractical for a human security analyst to be able to review the computer system logs and identify anomalies accurately. In fact, even SIEM computing systems are often quite noisy in their application of the rules of the rule engine and application of search criteria, generating a large number of false positives that require human security analyst review. Moreover, rules-based and search-based SIEM computing systems require a large amount of manual tuning and codification by human security analysts of their own knowledge of what to look for when attempting to identify anomalies.

Known methodologies of using human security analyst review of computer system logs for anomalies is fast becoming an impracticality as the amount of data traffic flowing to and from computing system resources increases with the increased reliance on computing systems to provide desired functionalities. That is, as the data traffic increases, the complexity and volume of the computing system logs generated for purpose of security and evaluation of proper functioning of the monitored computing system environment, also increases. Even known Security Information and Event Management (STEM) systems often suffer from significant drawbacks due to false positives, manual tuning, representation of human security analyst knowledge, and the like.

To reduce manual efforts, machine learning based anomaly detection mechanisms may be implemented where a computer executed machine learning model, such as a convolutional neural network (CNN), deep neural network (DNN), recurrent neural network (RNN), or other type of machine learning model. The process of training a machine learning (ML) model involves providing an ML algorithm (that is, the learning algorithm) with training data to learn from. The term "ML model" refers to the model artifact that is created by the training process. The training data contains the correct answer, which is known as a target or target attribute, and is also sometimes referred to as the "ground truth", such that the learning algorithm executes the ML model on the training data, generates an output based on the execution of the ML model on the training data, calculates a loss or error of the ML model relative to the correct answer, and then adjusts parameters of the ML model so as to reduce this loss or error. That is, the learning algorithm finds patterns in the training data that map the input data attributes to the target (the answer that the ML model should predict), and the learning algorithm outputs a trained ML model that captures these patterns.

ML model based anomaly detection mechanism may be implemented in order to classify computer system security logs. A variety of different ML models may be used for classifying computer system security logs, and in some cases an ensemble of such ML models may be utilized, such as an ensemble of the Random Forest, Gradient Boosting, and Deep Learning machine learning models, also referred to as "classifiers", as they classify the state of the computing system from the log data structure as to whether it is anomalous or not. In order to determine which ML model(s) to use in the particular anomaly detection mechanism being implemented, selection techniques may involve obtaining a score of each ML model on the entire dataset to determine whether to use the particular ML model. This score is calculated based on a determined accuracy of the ML model output on the entire dataset, such as based on user feedback on the outputs generated by the ML model, e.g., if the ML model indicates that the input is representative of a security threat or anomaly, a human user may review that output classification and determine if it is a true threat or a false positive and this information may be used to determine the accuracy of the ML model in predicting security threats/anomalies. Thus, the scoring is across the entire dataset which may encompass various types of security risks, attacks, threats, anomalies, etc.

It can be appreciated that some ML models operate better for different types of security risks based on the particular training algorithms used to train the ML models and/or the training data used to train the ML models. That is, some ML models, due to their training, may be better predictors and classifiers of particular patterns of input data indicative of particular security threats, anomalies, attacks, etc. (collectively referred to herein as "security risks"), than they are for other security risks because they have been trained on similar patterns in training datasets. Thus, scoring these ML models across an entire dataset may provide an inaccurate assessment of the ML model as the ML model's performance will be scored differently based on whether or not the dataset comprises security risks for which the ML model is well trained, or security risks for which the ML model is not as well trained. Hence, there is a concern about how to determine which ML models to use for security risk detection and implementation in a security information and event management system (SIEM), such that the best possible performance is achieved with regard to accuracy of security risk detection and handling for a variety of different types of security risks. Moreover, there is a need for a solution that provides a more fine grain evaluation of ML models and dynamic utilization of ML models on individual security logs, or data instances, for which they are best suited as opposed to using a single ML model across all security logs, including ones for which the ML model is not best suited.

The illustrative embodiments provide mechanisms for dynamic ML model selection for computing system security based on each individual ML model's performance on individual logs (i.e. subset of security data) within an overall log data structure, such that a plurality of different ML models may be implemented, each processing a different subset of security data within the overall log data structure to evaluate each subset of security data with regard to whether it likely represents an anomaly or not. With the mechanisms of the illustrative embodiment, an incoming log is classified into a class of ML models, or ML model class, that will most likely perform well on the incoming log, and then based on the classification, one or more corresponding ML models are applied to the incoming log to obtain a classification result, e.g., anomalous (security risk or threat) or non-anomalous. This mechanism enables different ML models to be utilized on different ones of the logs within the log dataset. That is, while individual ML models may not perform well overall on all the logs, they will perform well on particular types of logs and thus, by using the different ML models on logs that they are well trained to operate on, such that a plurality of ML models are implemented, each for processing their corresponding class of logs that they are well suited for, a highest overall predictive accuracy is achieved.

In some illustrative embodiments, each individual ML model, or subset of ML models, may operate on the particular logs that the ML model is best suited for based on the classification discussed above. The outputs of the individual log classifications may then be collected either as individual classifications of individual logs within the log data structure, or may be collected together to provide a single output classification for the entire log data structure, which is then provided to the SIEM system for presentation to a human analyst or for performance of other automated computer security processes that may be provided by the STEM system. For example, a listing of classifications of logs within the log data structure may be provided with corresponding classifications. Alternatively, an overall classification for the entire log data structure may be output via a user interface of the SIEM system based on a combination of the classifications of the individual logs. The combination may use logic operators, such as an OR operator or the like, such that if any of the individual logs is classified as anomalous, the overall classification is anomalous, for example. The user interface of the STEM system may further provide a drill down interface where a user may investigate a security log data structure whose overall classification is anomalous, to obtain the individual classifications of each of the individual logs within the log data structure to thereby narrow down the potential source of the anomaly, and drill down further into the specific log data for the anomalous logs within the log data structure.

In other illustrative embodiments, the mechanisms of the illustrative embodiments may be used to build ensembles of ML models for processing individual logs within a log data structure and/or for the log data structure as a whole. For example, based on the classifications of all of the logs within the log data structure, each individual ML model that is best suited for each of the logs within the log data structure may be identified. Thereafter, the collection of all of the ML models that are best suited for the individual logs may be combined into an ensemble, with ensemble logic for combining outputs of the individual ML models to generate a final predicted classification of the input security log data structure.

For example, in some illustrative embodiments, a plurality of ML models may be trained on one or more training datasets, where the training datasets comprise training data where it is known whether the input data includes a security risk (e.g., security threat, attack, anomaly, etc.) or not, and includes a correct classification (e.g., ground truth) regarding the classification of the input as being a security risk or not. In one illustrative embodiment, the ML models, e.g., convolutional neural networks (CNNs), deep neural networks (DNNs), recurrent neural networks (RNNs), Random Forest models, Gradient Boosting models, etc., are trained to classify the input as to whether or not the logged event should be escalated or not, where escalation refers to the logged event being presented as an anomaly for further human analyst review. Thus, in some illustrative embodiments, the ML models output a binary output indicative of either a CLOSE classification (i.e. the log is not anomalous) or an ESCALATE classification (i.e. the log has a sufficient probability or likelihood of being anomalous). This is only one possible implementation and it should be appreciated that other illustrative embodiments may be configured to provide classifications of different levels of granularity and complexity, e.g., rather than a binary output of CLOSE or ESCALATE, individual classifications for different types of security risks may be provided as output, such as vector outputs in which each vector slot corresponds to a different classification and values in each of the vector slots indicate a probability that the corresponding classification applies to the particular inputs.

In one illustrative embodiment, a training dataset is provided that has security log data and corresponding ground truth labels indicating whether the proper output of a properly trained ML model should indicate that the security log should be closed or escalated. This training dataset may be split into two subsets of training data, a level one training dataset and a level two training dataset. The level one training dataset may be used to train the plurality of ML models using a machine learning training process, as is generally known in the art, e.g., supervised or unsupervised machine learning process. The trained ML models are then used to make predictions of the classifications of the logs in the level two training dataset, e.g., classify each of the logs in the level two training dataset as to whether it should be closed (non-anomalous) or escalated (anomalous)

For each data instance (e.g., log) in the level two training dataset, a loss function-based ranking of each of the ML models' predictions is formed based on performance factors of the corresponding ML model. It should be appreciated that the predictions that the ML models generate are probability values, also referred to as confidence values, indicating the probability/confidence that the input is properly classifiable as CLOSE or ESCALATE. Thus, for example, the ML model may calculate a value of 0.74 for ESCALATE and 0.26 value for CLOSE, indicating that the particular input log (data instance) is 74% likely to be anomalous and thus, should be escalated.

The performance factors evaluated for determining the loss-based ranking of the ML model include the accuracy of the ML model, i.e. how close the prediction generated by the ML Model is to the ground truth or true value. For example, if the ML model determines that the log entry should be classified as ESCALATE, and the ground truth indicates that the proper classification is CLOSE, then the ML model's accuracy is low for that log (data instance). If the ML model predicts a classification of CLOSE, and the ground truth indicates that the proper classification is ESCALATE, then the ML model's accuracy is also low. However, as it is more troublesome to classify an anomalous log as CLOSE (non-anomalous) than it is to classify a non-anomalous log as ESCALATE, the relative evaluation of the accuracies of the model may give a lower score to ML models that indicate an anomalous log to be non-anomalous, than a ML model that indicates a non-anomalous log to be anomalous. If the ML model properly classifies the log input as CLOSE or ANOMALOUS, then the accuracy is determined to be relatively high.

The performance factors may also include an evaluation of the probability or confidence values as well. Again, the probability/confidence percentage, e.g., the 0.74, on the ML model's prediction indicates how confident the ML model is that the corresponding classification applies to the input, e.g., the security log. Preference is given to high confidence if it corresponds to an accurate prediction. Preference is also given to low confidence if it corresponds to an inaccurate prediction. That is, an ML model is operating best for a particular input if it is makes a correct prediction with high confidence and makes incorrect predictions with low confidence. Thus, by evaluating not only the accuracy of the ML model, but also the probability/confidence values as well, it can be determined with the ML models is making good predictions with high confidence and bad predictions with low confidence.

In addition, the performance factors may include an evaluation of risk with regard to mispredictions of the ML model. That is, as noted previously, it is less risky if a ML model predicts a non-anomalous security log to be anomalous, than it is if the ML model predicts an anomalous security log to be non-anomalous. Thus, in addition to the accuracy and confidence, the ranking of the ML models may evaluate the risks of the mispredictions of the ML model with regard to the predictions being made by that ML model.

Each of these performance factors are scored according to a predetermined range for scoring, and the scores are combined to generate a relative ranking for each of the trained ML models, with regard to each of the security logs (data instances) in the level two training dataset. These ML model rankings are then added to the level two training datasets such that each of the individual logs (data instances) within the level two training dataset has an associated listing of ML model identifiers and their corresponding rankings. This ML model rank listing of ML model identifiers and their corresponding rankings may be used to identify which ML models perform better for the corresponding type of security log (data instance). The ML model rank listing further permits creation of groups of logs for each ML model based on which logs the particular ML model works best with, i.e. is the highest ranking ML model in the ML model rank listings. Thus, for example, there may be 50 different logs within the level two training dataset for which a Random Forest model is determined to be the highest ranking ML model and as a result, for the Random Forest model, a group of these 50 different logs is generated. Similarly, for another 100 different logs within the level two training dataset, it may be determined that the Gradient Boosting model is the highest ranking ML model and thus, for the Gradient Boosting model, a corresponding grouping of these 100 different logs is generated. Thus, groupings, or subsets of the level two dataset logs may be correlated with different ML models for which the ML models is the best suited to classify the corresponding logs in the grouping.

Having augmented the level two training dataset to include the ML model rank listing for each of the data instances (logs) in the level two training dataset, and generated the subsets or groupings of the logs for each ML model, a ML model selector is trained on the level two training dataset and the subsets of logs in association with the ML models. The ML model selector may be another machine learning model, e.g., neural network, that is trained to classify incoming logs into one of the subsets of logs and thereby select a corresponding ML model that is best suited for classifying the incoming log. This subset of logs may be considered a machine learning model class since the subset identifies a corresponding machine learning model that is best suited for classifying logs having features similar to the logs in the subset of logs.

As the augmented level two training dataset has the ground truth of which subset of logs (machine learning model class) each of the logs belongs to (based on the above grouping of logs), each of the logs in the level two training dataset may be input to the ML model selector which may predict a subset for the log, such as based on features or attributes of the log, which can then be compared to this ground truth and parameters of the ML model selector adjusted to reduce the loss or error, in a machine learning process to train the ML model selector to properly classify an input log into one of the subsets of logs correlated with ML models. Thus, by classifying an input log into a predetermined subset of logs (machine learning model class), the corresponding ML model is determined to be the best suited ML model for processing the input log and generating the most accurate classification, with the highest achievable confidence, and lowest risk achievable by the trained ML models.

As an example, assume that a plurality of ML models, e.g., Random Forest, Gradient Boosting machine (GBM), SVM, DL neural network, and the like, are trained using the level one (L1) training dataset which includes a log (data instance) and a corresponding correct classification of "CLOSE". Each of the ML models will classify the log as either "CLOSE" or "ESCALATE" with a corresponding confidence score associated with the classification. Thus, for example, the Random Forest model may classify the log as CLOSE with a 97.868% confidence, the DL neural network may classify the same log as CLOSE with an 86.357%, the GBM model may classify the log as CLOSE with 89.235% confidence, and a SVM may classify the log as ESCALATE with a 63.457% confidence. In this case, the best ML model for classifying the log is determined to be the Random Forest (RF) model as it has the correct output classification with the highest confidence, and lowest risk of misprediction as the prediction is correct. The SVM model generated the wrong classification with a high confidence and thus, is clearly the lowest ranking ML model in this example. With regard to the level two training of the ML model selector, the same input features of the log are input to the ML model selector, however, the ML model selector will instead generate an output prediction indicating a selected ML model based on the classification of the input features into a corresponding class of logs and a corresponding ML model associated with that class of logs.

Having trained the ML model selector in the manner described above, during runtime operation, the ML model selector may receive an incoming log from a log data structure, and may classify the incoming log into one of the subsets (machine learning model class) which, in turn is associated with a corresponding trained ML model from the plurality of trained ML models. The classification by the ML model selector is thereby converted to a ML model selection which can then be used to process the incoming log and classify it as to whether it should be CLOSE or ESCALATE. This process may be repeated for each log in a log data structure such that a plurality of classifications, one for each of the logs in the log data structure, may be generated. As noted above, in some illustrative embodiments, a combination of these classifications may be used to generate a single classification for the log data structure as a whole, such as by using a logical "OR" operation, for example. In some cases, the probability/confidence values or scores may be combined using a suitable function to generate an overall probability/confidence score for the log data structure as a whole, e.g., an average of the individual probability/confidence scores, a weighted average where certain ML models may be given greater weight values than others, or the like.

In some cases, the weighting may be based on whether or not the original probability/confidence is above a threshold or not, e.g., if the confidence is above a first threshold, the weight is "2", if the score is above a second threshold, the weight is "3", etc., to thereby more heavily weight confidences indicating ESCALATION. Similarly, weights can be given for confidences below other thresholds, e.g., "2" for a confidence below a particular threshold. For example, if a first ML model gives a first log a score of 0.84 for ESCALATION, and a second ML model gives a second log a score of 0.46 for ESCALATION, and a third ML model gives a third log a score of 0.22 for ESCALATION, the average score may be 0.47 and thus, overall the log data structure may be given an average probability/confidence score of 0.47 and thus, may be considered to be non-anomalous. With a weighted average and thresholds of 0.25, 0.60, and 0.80, the first score (0.84) may have a weight of "3" applied, the second score (0.46) may be given a weight of "1", and the third score (0.22) may be given a weight of "2", resulting in a weighted average of ((0.84*3)+0.46+(0.22*2))/6=0.57 and thus, the overall score for the log data structure may indicate an anomalous log data structure and a classification of ESCALATION.

The classification may be provided to a downstream computing system, such as a STEM system or the like, for further responsive action. The responsive action may take any known or later developed form including output a notification to a human analyst, such as via a user interface, for those logs or log data structures whose classification is determined to be ESCALATE. The user interface may comprise user interface elements for drilling down into the details of the notification, including identifying the individual logs within the log data structure and their corresponding classifications by corresponding ML models. In this way, the human analyst may identify which logs contributed to an ESCALATE classification for the log data file and which ML models generated the classifications. Moreover, probability/confidence values, weighting values, and the like, for the classifications of the logs may be provided in the notification to indicate more basis for the classification of the log data structure and/or individual logs. User interface elements may be provided for allowing the user to provide input to indicate a correctness/incorrectness of the classification of the logs and/or log data structure such that this information may be stored for creation of new training datasets for updating the training of the ML models and/or ML model selector at a future time.

Other responsive actions may be provided in the form of automated processes initiated by the STEM system in response to the classification of the log data structure as one that requires escalation. For example, automated processes may be initiated for blocking access to computing system resources associated with the logs which indicated the log data structure to be anomalous and requiring escalation. In other implementations, automated processes may be performed for taking responsive security actions such as disabling computing resources that are determined to be likely targets of the potential security threat, sandboxing, redirection of traffic, such as to a honeypot, or the like.

In one illustrative embodiment, the ML model selector may be used to generate an ensemble of ML models to be used to process an incoming log data structure. For example, assuming that the ML model selector has already been trained in the manner previously described above, when incoming security log data structures are received, the logs of the security log data structure may be classified by the ML model selector to thereby identify for each log the preferred ML model for processing the log. A count of each ML model may be maintained, where the count is incremented for each log that the ML model selector determines the ML model is best suited to process. Thereafter, the counts of the ML models may be used to select a top N number of ML models to include in the ensemble, where N is any integer suitable to the particular implementation desired, e.g., the top 3 ML models. The top N ML models are then combined into an ensemble of ML models in which ensemble logic is provided for combining the classification outputs of the individual ML models into a single classification for each of the logs and/or the log data structure as a whole.

It should be appreciated that this selection of ML models, whether individually for each log in the log data structure, for inclusion in the ensemble of ML models, or both, depending on the desired embodiment, may be performed dynamically for each log data structure received. That is, different ML models and different ensembles of ML models may be selected for different logs and/or log data structures. The ML models processing the logs and/or log data structure as a whole, are dynamically selected based on which ML models are best suited for processing the particular patterns of features of the logs in the log data structure as determined from the training of the ML model selector. Thus, the best set of ML models are always selected for the particular logs within the incoming log data structures.

It should be appreciated that while the primary illustrative embodiments are described in the context of analyzing computer system log data structures to identify events in the computer system log data structures indicative of anomalous events possibly associated with computer security threats/attacks, unauthorized accesses to computing system resources, or any other logged events of particular interest that may require an escalation of the evaluation of the events, the illustrative embodiments are not limited to such. Rather, the illustrative embodiments may be implemented in a variety of different computing system environments for dynamically selecting ML models and using the dynamically selected ML models for performing classifications of event patterns in input data indicative of a particular classification of interest. For example, in a medical field, the dynamic ML model selection mechanisms of the illustrative embodiments may be used as a basis for classifying medical image data that is input to the mechanisms of the illustrative embodiments, with regard to whether or not anomalous regions are present in the medical image data, such as cancerous tumors, blockages in blood vessels, or any other medical anomaly that may be detected in medical images. Thus, the mechanisms of the illustrative embodiments may be used to identify medical images as anomalous or not and provide the anomalous medical image data to a radiologist or other appropriate personnel for evaluation, i.e. escalate the medical image data. In this way, the mechanisms of the illustrative embodiments may be utilized to assist radiologists and other appropriate personnel by focusing their attention on only the medical image data where anomalies are likely present using the best suited ML models for the particular medical image data. This is only one other possible implementation of the mechanisms of the illustrative embodiments. Many others exist where such anomaly classification may be performed using the improved computer tool of the illustrative embodiments.

Before discussing the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example block diagram illustrating an operation of primary operational elements of an improved computing tool according to one illustrative embodiment. For purposes of the present description, it will be assumed that the illustrative embodiments are being implemented as part of a computer security mechanism and specifically are directed to detecting anomalies in computing system or computing resource security event log data. However, as noted above, this is only one possible implementation falling within the scope of the illustrative embodiments, and is not intended to be limiting on the present invention. Other implementations in which anomalous patterns within input data may be identified, may also be used without departing from the spirit and scope of the present invention.

In order to be able to dynamically select ML models for processing logs of a log data structure during runtime operation, it is first necessary to train a ML model selector to classify incoming logs into one of a plurality of classes or groups of logs and identify corresponding ML models associated with these classes or groups of logs. Thus, FIG. 1 will first be described in terms of the training of the ML model selector, and thereafter, with regard to both FIGS. 1 and 2, the runtime operation of the trained ML model selector will be described.

With regard to the training of the ML model selector 160, as shown in FIG. 1, a training dataset 110 is provided by a training dataset source (not shown). The training data in the training dataset 110 comprises training data entries, representing security log entries, which each may represent non-security risk data and/or represent security risks, e.g., security threats, attacks, anomalies, etc. Each training data entry also has a corresponding correct classification for that training data entry, e.g., closed (non-anomalous) or escalate (anomalous). This training dataset 110 is split into a first subset of training data 115, referred to as the level one training dataset 115, and a second subset of training data 120, referred to as the level two training dataset 120. The level one training dataset 115 and level two training dataset 120 each comprises training data having entries, e.g., logs, data instances, etc., that represent non-security risk and security risks 112, 122, along with their corresponding correct classifications 113, 123, or ground truth classifications. The level one training dataset 115 is used to train a plurality of ML models 130, whereas the level two training dataset 20 is used to score/rank the trained ML models 150 and train the ML model selector 160.

As shown in FIG. 1, a plurality of ML models 130 may be trained on the level one dataset 115. The ML models 130 may comprise various different types of convolutional neural networks (CNNs), deep neural networks (DNNs), recurrent neural networks (RNNs), or other types of machine learning models. For example, the ML models 130 may include a deep learning (DL) models, Random Forest (RF) models, Gradient Boosting Models (GBMs), Support Vector Machine (SVM) models, etc. The ML models in the plurality of ML models 130 are trained to classify the input as to whether or not the logged events should be escalated or not, where escalation refers to the logged event being presented as an anomaly for further human analyst review or automated responsive action by a downstream computing system, such as a STEM system or the like. In the depicted example illustrative embodiment, for ease of explanation, it is assumed that the ML models output a binary output indicative of either a CLOSE classification (i.e. the log is not anomalous) or an ESCALATE classification (i.e. the log has a sufficient probability or likelihood of being anomalous). As mentioned previously above, this is only one possible implementation and it should be appreciated that other illustrative embodiments may be configured to provide classifications of different levels of granularity and complexity, e.g., rather than a binary output of CLOSE or ESCALATE, individual classifications for different types of security risks may be provided as output, such as vector outputs in which each vector slot corresponds to a different classification and values in each of the vector slots indicate a probability that the corresponding classification applies to the particular inputs.

The level one training dataset 115 is used, by machine learning training engine 135, to train the plurality of ML models 130 using a machine learning training process, as is generally known in the art, e.g., supervised or unsupervised machine learning process, depending on the particular ML models being trained. The machine learning training engine 135 may implement known or later developed machine learning processes to train the ML models 135 and thus, a more detailed explanation of the training process is not provided herein. The trained ML models 130 are then used to make predictions 140 of the classifications of the logs in the level two training dataset 120, e.g., classify each of the logs 122 in the level two training dataset 120 as to whether it should be closed (non-anomalous) or escalated (anomalous). These classifications may be compared, by ML model ranking engine 150, to the corresponding ground truth classifications 123 to determine a loss or error of the corresponding ML model with regard to particular performance factors, such as accuracy, confidence, and risk.

Thus, for example, for each data instance (e.g., log entry) 122 in the level two training dataset 120, a loss function-based ranking of each prediction generated by each of the ML models, in the plurality of ML models 130, is formed based on the performance factors (accuracy, confidence, risk) of the loss determination for the corresponding ML model. For each classification prediction 140 generated by each ML model in the plurality of trained ML models 130, the loss is determined and an evaluation of the combination of the accuracy of the classification, the confidence in the classification, and the risk of misprediction of the classification is performed by the ML model ranking engine 150. That is, a ranking score is calculated based for each ML model for each security log 122. Thus, for example, for a first security log 122, for SVM a first ranking score is generated, for DL a second ranking score is calculated, for GBM a third ranking score is calculated, etc. These scores indicate the relative ranking of the ML models for processing the security log, e.g., for a first security log 122, SVM has a higher ranking than GBM, which has a higher ranking than DL, etc. The ranking score for a ML model is generated using a function based on the comparison of the prediction to the correct classification 123 for the security log 122 and a determination of the accuracy, confidence, and risk of misprediction such that ML models that make correct predictions with high confidence and incorrect predictions with low confidence are ranked higher than ML models that make incorrect predictions with high confidence and correct predictions with low confidence. Moreover, the ranking score prefers ML models that are overinclusive of escalation classifications rather than underinclusive, as the risks associated with not escalating security logs that are erroneously predicted as non-anomalous are higher than risks associated with escalating security logs that are erroneously predicted as anomalous.

The preferences may be implemented in the function as weights, for example, e.g., a ML model ranking function $F( )$ may be defined as $F( )=W1*A+W2*C+W3*R$, where A is accuracy of the classification generated by the ML model, C is the confidence that ML model has in the classification, and R is a risk that a misprediction by the ML model will cause a security issue, and where the weights may be set based on the accuracy A of the prediction and the nature of the prediction relative to the correct classification. For example, W1 may be high if the accuracy A is high and low if the accuracy A is low. W2 may be negative or lower if the accuracy A is low and positive or higher if the accuracy A is high. W3 may be negative of low if the actual prediction is CLOSE and the correct classification is ESCALATE, and may be positive or high if the actual prediction is ESCALATE and the correct classification is CLOSE or ESCALATE. This is only one example type of function that can be used to determine the rankings of the ML models and is not intended to be limiting on the illustrative embodiments. To the contrary, any function that provides a relative ranking of the ML models based on their predicted classifications may be used without departing from the spirit and scope of the present invention.

The ML model rankings are then added by the ML model selector training engine 155 to the level two training dataset 120 such that each of the individual logs (data instances) 122 within the level two training dataset 120 has an associated listing of ML model identifiers and their corresponding rankings as generated by the ML model ranking engine 150. This ML model rank listing of ML model identifiers and their corresponding rankings may be used to identify which ML models in the plurality of ML models 130 perform better for the corresponding type of security log (data instance) 122. The ML model rank listing further is used by the ML model selector training engine 155 as a basis for the creation of groups (or classes) of logs for each ML model based on which logs the particular ML model works best with, i.e. is the highest ranking ML model in the ML model rank listings.

These groupings (subsets) or classes of logs in the level two dataset 120 may be correlated with different ML models for which the ML model is the best suited to classify the corresponding logs in the grouping (subset) or class. The subsets or classes of logs may be considered machine learning model classes as they identify a corresponding ML model that is best suited for classifying logs having features similar to the features of the logs in the subclass. Thus, the ML model selector training engine 155 correlates ML models with classes of security logs and augments the training dataset 120 with associations of the individual security logs in the training dataset 120 with the particular classes and ML models.

The augmented level two training dataset 120 and the generated classes of the logs for each ML model (machine learning model classes) are used to configure the ML model selector 160 and train the ML model selector 160 on the augmented level two training dataset 120. The ML model selector 160, which is another machine learning model, is trained by the ML model selector training engine 155 to classify incoming logs into one of the classes of logs (machine learning model classes) and thereby select a corresponding ML model that is best suited for classifying the incoming log. That is, the logs in the augmented level two training dataset 120 have particular patterns of features which may be input to the ML model selector 160 as input and upon which the ML model selector 160 operates to predict a class of logs to which the input log should be classified. This prediction may then be compared to the actual class of logs with which the log entry in the augmented level two training dataset 120 is classified to determine a loss and through a machine learning process, the ML model selector 160 is trained to reduce this loss. This may be done with each of the logs in the augmented level two training dataset 120 until an acceptable level of loss is achieved.

In predicting which class of logs (machine learning model class) an input logs should be classified, the ML model selector 160 effectively is selecting a corresponding ML model that should be used to process the log and generate a classification of the log. That is, based on the operation of the ML model ranking engine 150, a correlation between classes of logs and ML models is generated. This correlation may be used by the ML model selector 160 to look up, for an input log, based on the class of logs which the ML model selector 160 classifies the input log into, a corresponding ML model. This prediction of a ML model to use may then be used to process the log and/or generate an ensemble of ML models to process the log and/or log data structure comprising the log.

Having trained the ML model selector 160 in the manner described above, during runtime operation, as shown in FIG. 2, the ML model selector 160 may receive an log data structure 195 from a monitored computing environment 102 having a plurality of computing system resources, e.g., hardware and/or software resources, data structures, and the like, where the log data structure 195 includes logs 197 which may represent non-anomalous events and/or anomalous events indicative of a security threat, attack, anomaly, or the like. The ML model selector 160 may generate a prediction 170 of a classification of the incoming log into one of the classes of logs which, in turn is associated with a corresponding trained ML model from the plurality of trained ML models 130. The classification 170 by the ML model selector 160 is thereby converted to a ML model selection which can then be used to process the incoming log and classify it as to whether it should be CLOSE or ESCALATE. This process may be repeated for each log in a log data structure 195 such that a plurality of classifications, one for each of the logs in the log data structure 195, may be generated. In some illustrative embodiments, a combination of these classifications may be used to generate a single classification for the log data structure as a whole, such as by using a logical "OR" operation, for example. In some cases, the probability/confidence values or scores may be combined using a suitable function to generate an overall probability/confidence score for the log data structure as a whole, e.g., an average of the individual probability/confidence scores, a weighted average where certain ML models may be given greater weight values than others, or the like.

In the depicted example, rather than running a separate selected ML model on each log in the log data structure 195, the ML models selected by the ML model selector 160 for each of the logs may be used by ensemble generation engine 180 to generate an ensemble of ML models 190 to process the input log data structure 195. For example, the ML model selector 160 selects ML models for each of the logs in the log data structure 195. The ensemble generation engine 180 maintains a count for each ML model in the plurality of ML models 130 indicating how many times the ML model selector 160 selects the corresponding ML model as the best ML model to process a log in the input log data structure 195. The counts may then be used by the ensemble generation engine 180 to select the top N number of ML models from the plurality of ML models 130 to be included in the ensemble, where a ML model is a "top" ML model based on having a higher count value than other ML models in the plurality of ML models 130. Thus, if N=3, then the ML models having the 3 highest count values are selected for inclusion in the ensemble 190.

The ensemble generation engine 180 generates an ensemble of ML models 190 by taking the selected N number of ML models and providing ensemble logic for causing each of the ML models to process the same input log data structure 195 to generate separate output classifications of the input log data structure 195. The ensemble generation engine 180 further provides ensemble logic for combining the output classifications generated by the ML models in the ensemble 190 so as to generate a single output classification 192 for the input log data structure 195. This ensemble logic may combine the outputs using any suitable function determined appropriate for the particular implementation, e.g., an average calculation on the outputs, a majority vote output, or the like.

The resulting classification output 192 generated by the ensemble 190 may be output to a STEM system 199 or other downstream computing system for performance of a responsive action. The responsive action may take any known or later developed form including output a notification to a human analyst, such as via a user interface, for those logs or log data structures whose classification is determined to be ESCALATE. The user interface may comprise user interface elements for drilling down into the details of the notification, including identifying the individual logs within the log data structure and their corresponding classifications by corresponding ML models. In this way, the human analyst may identify which logs contributed to an ESCALATE classification for the log data file and which ML models generated the classifications. Moreover, probability/confidence values, weighting values, and the like, for the classifications of the logs may be provided in the notification to indicate more basis for the classification of the log data structure and/or individual logs. User interface elements may be provided for allowing the user to provide input to indicate a correctness/ incorrectness of the classification of the logs and/or log data structure such that this information may be stored for creation of new training datasets for updating the training of the ML models and/or ML model selector at a future time.

Other responsive actions may be provided in the form of automated processes initiated by the STEM system in response to the classification of the log data structure as one that requires escalation. For example, automated processes may be initiated for blocking access to computing system resources associated with the logs which indicated the log data structure to be anomalous and requiring escalation. In other implementations, automated processes may be performed for taking responsive security actions such as disabling computing resources that are determined to be likely targets of the potential security threat, sandboxing, redirection of traffic, such as to a honeypot, or the like.

Thus, the illustrative embodiments provide mechanisms for dynamically identifying which machine learning models are best suited, i.e. provide the best accuracy, confidence, and lowest risks with regard to misprediction, for each of the types of logs within a log data structure representing security events occurring within a monitored computing system environment. Ensembles of machine learning models may be dynamically generated for processing such log data structures and generating classifications of the log data structures with regard to security classifications, such as CLOSE and ESCALATE for example. Moreover, the mechanisms of the illustrative embodiments may operate in conjunction with SIEM systems and/or other downstream computing systems to perform responsive actions in the event that a classification indicates a need to escalate the processing of the log data structure, which may include outputting notifications via user interfaces that may be provide functionality for drilling down into the details of the individual logs, their classifications, and the like.

Figure 3:
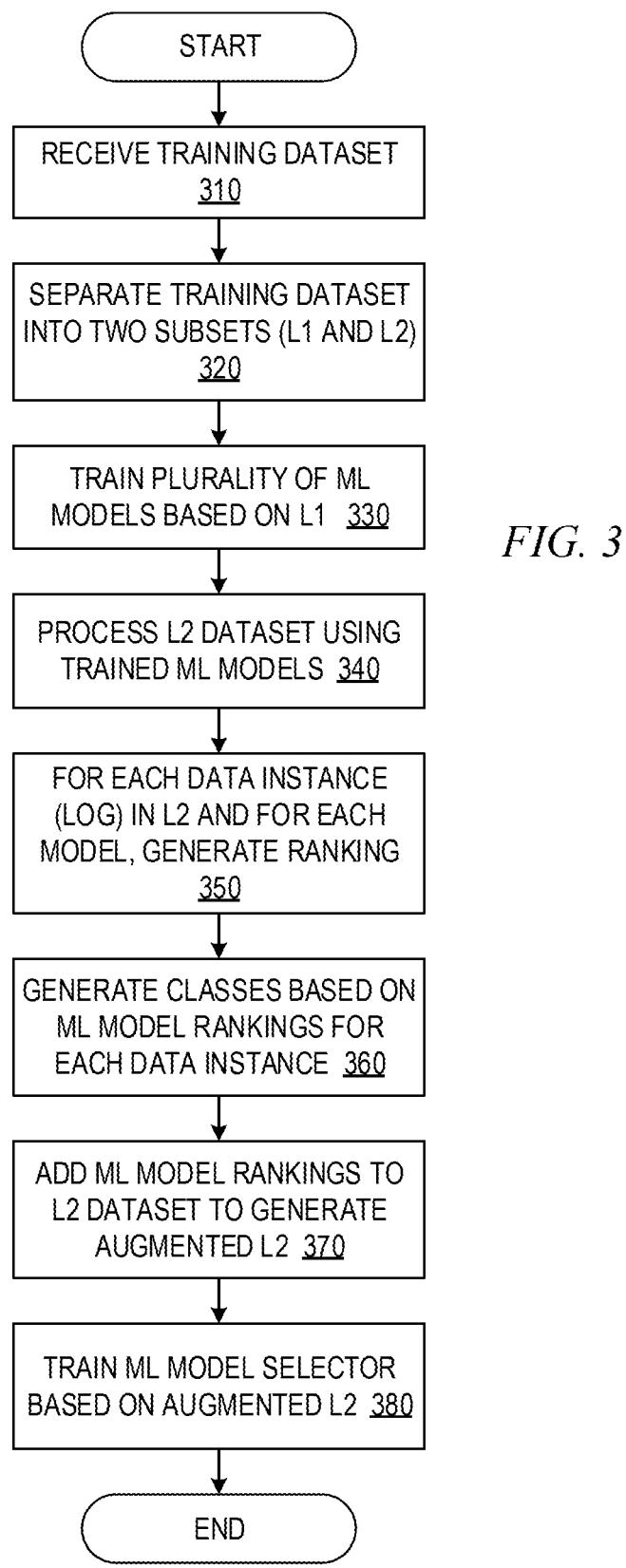
FIG. 3 is a flowchart outlining an example operation for training a ML model selector in accordance with one illustrative embodiment.

FIG. 3 is a flowchart outlining an example operation for training a machine learning (ML) model selector in accordance with one illustrative embodiment. As shown in FIG. 3, the operation starts by receiving a training dataset comprising entries corresponding to security risks, e.g., threats, alerts, anomalies, etc., and their corresponding correct classifications, e.g., CLOSE or ESCALATE (step 310). The received training dataset is separated into two subsets including a level one training dataset subset and a level two training dataset subset (step 320). A plurality of ML models are trained using the level one training dataset (step 330). The trained ML models are then used to process the level two training dataset to generate predictions of classifications on the logs within the level two training dataset (step 340). For each log in the level two training dataset, and for each ML model, a loss function based ranking of the ML model's predicted classification is generated based on the predicted classification's accuracy, confidence, and risk (step 350). For each ML model, a grouping of logs for which that ML model is the highest ranking ML model is generated to thereby define a plurality of classes of logs and corresponding ML models (step 360).

The ML model rank listing is added to the log entry in the level two training dataset to generate an augmented level two training dataset (step 370). The augmented level two training dataset is then used to train the ML model selector to classify logs in the augmented level two training dataset into the plurality of classes of logs and thereby select a corresponding ML model that corresponds to the class in which the log is classified by the ML model selector (step 380). The operation then terminates.

Figure 4:
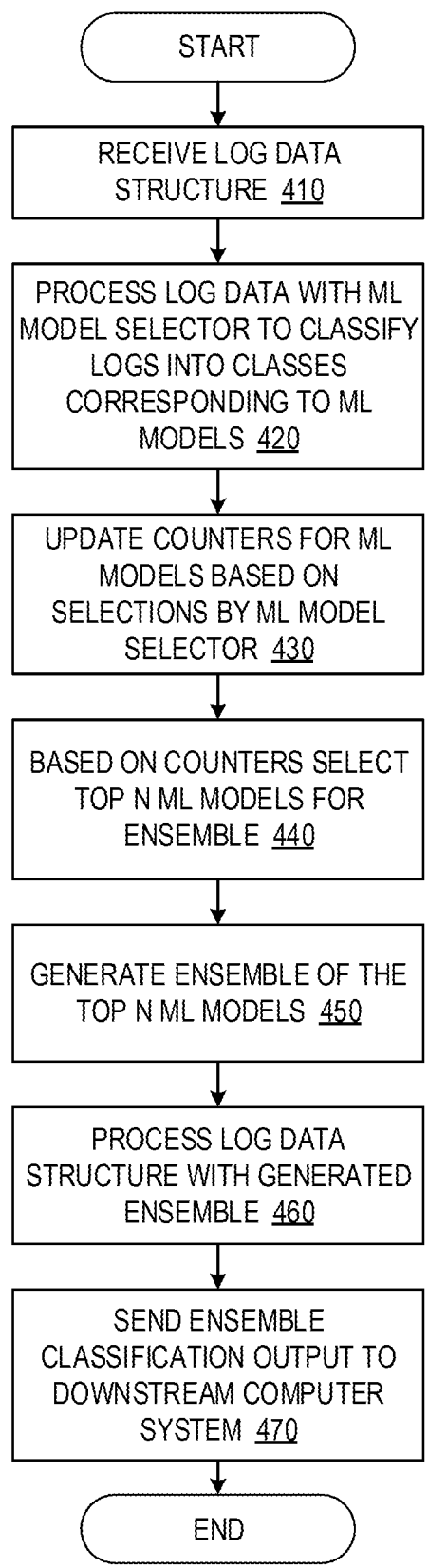
FIG. 4 is a flowchart outlining an example operation for dynamically generating an ensemble of ML models in accordance with one illustrative embodiment.

FIG. 4 is a flowchart outlining an example operation for dynamically generating an ensemble of ML models in accordance with one illustrative embodiment. As shown in FIG. 4, the operation starts by receiving a log data structure for processing and classification with regard to the presence of a security risk (step 410). This incoming log data structure is processed by the ML model selector to classify the logs in the log data structure into different classes of logs corresponding to ML models which then become selected ML models (step 420). The selection of ML models by the ML model selector is used to update counters associated with each of the ML models in a plurality of ML models (step 430). The counters are then used by an ensemble generation engine to select a top N number of ML models having the highest count values (step 440). The ensemble generation engine generates an ensemble of ML models based on the selected top N number of ML models and ensemble logic for causing each of the ML models to process the incoming log data structure and for combining the outputs of the individual ML models to generate a single classification output from the ensemble (step 450). The incoming log data structure is then processed by the ensemble of ML models (step 460) and the resulting classification output is provided to a downstream computing system, such as a SIEM computing system, for responsive action (step 470). The operation then terminates.

Figure 5:
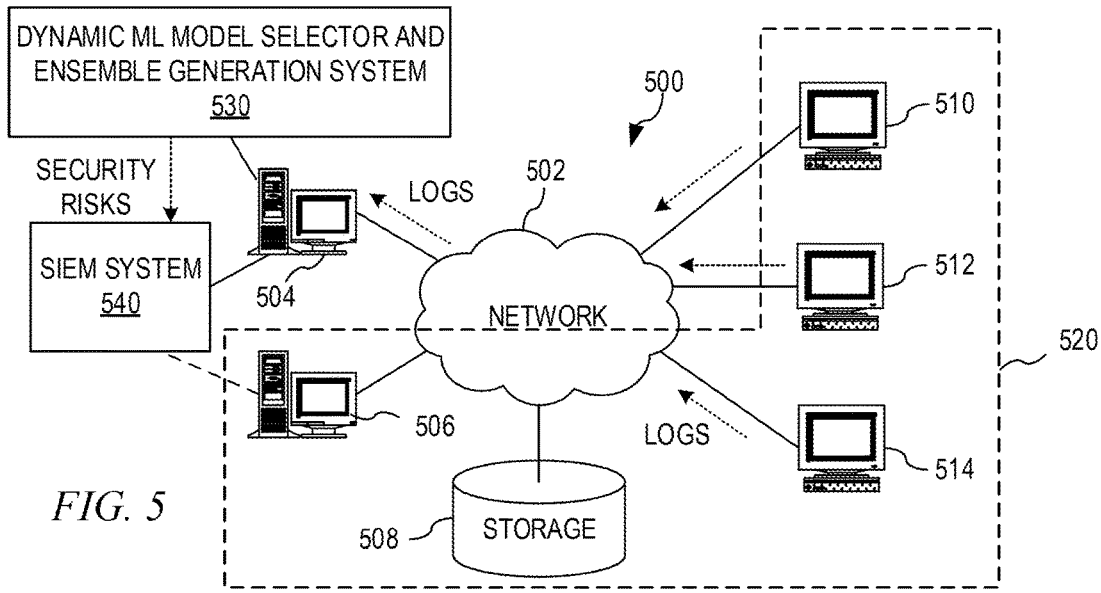
FIG. 5 is an example diagram of a distributed data processing system in which aspects of the illustrative embodiments may be implemented.
Figure 6:
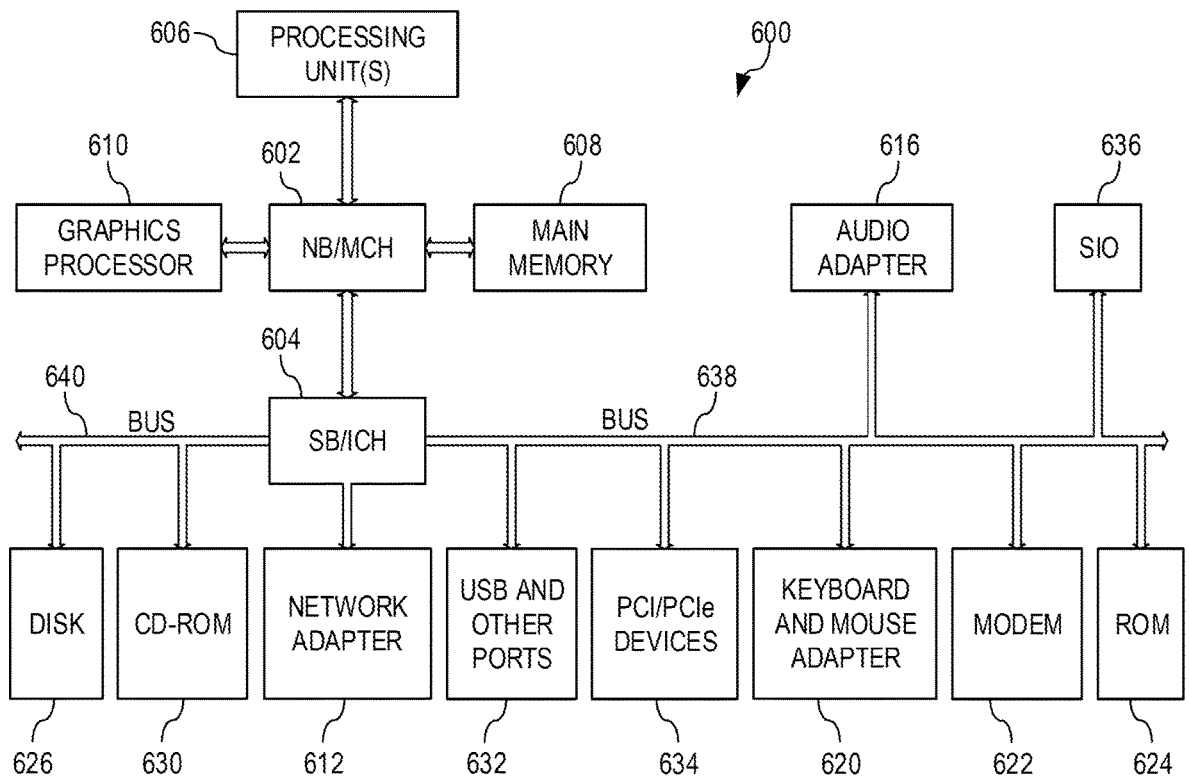
FIG. 6 is an example block diagram of a computing device in which aspects of the illustrative embodiments may be implemented.

From the above description it can be appreciated that the illustrative embodiments may be utilized in many different types of data processing environments. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504, may be specifically configured to implement a dynamic ML model selector and ensemble generation system 530 in accordance with one or more of the illustrative embodiments previously described. For example, the dynamic ML model selector and ensemble generation system 530 may comprise the components shown in FIG. 1 and described above, e.g., the plurality of ML models 130, the ML model training engine 135, the ML model ranking engine 150, the ML model selector training engine 155, the ML model selector 160, and the ensemble generation engine 180. During a training phase of operation, where the ML models are being trained and the ML model selector is being trained, the dynamic ML model selector and ensemble generation system 530 may operate in the manner described above with regard to FIG. 1. During a runtime phase of operation, the dynamic ML model selector and ensemble generation system 530 may operate as described above with regard to FIG. 2, in one or more illustrative embodiments.

The configuring of the computing device, e.g., server 504, to implement the dynamic ML model selector and ensemble generation system 530 may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments, and is not a general purpose computing device. Moreover, as described hereafter, the implementation of the mechanisms of the illustrative embodiments improves the functionality of the computing device and provides a useful and concrete result that facilitates anomaly detection using a hybrid unsupervised and semi-supervised machine learning computer tool that minimizes human intervention and provides improved accuracy of anomaly detection.

As shown in FIG. 5, assuming that the ML model selector 160 has been trained in the manner described previously with regard to FIG. 1 above and one or more of the described illustrative embodiments, a monitored computing system environment 520 may be equipped with monitoring agents (not shown) and other known mechanisms for obtaining computer system security log data (or "logs") which is transmitted to the server 504 via the network 502. For example, this log data may be data that is already routinely sent to the STEM system 540, which may be implemented and executing on server 504, server 506, or another computing system. For purposes of illustration, it will be assumed that the STEM system 540 is implemented on server 504 which is not part of the monitored computing environment 520, however this is only for illustration purposes and is not intended to be limiting on the present invention.

Figure 2:
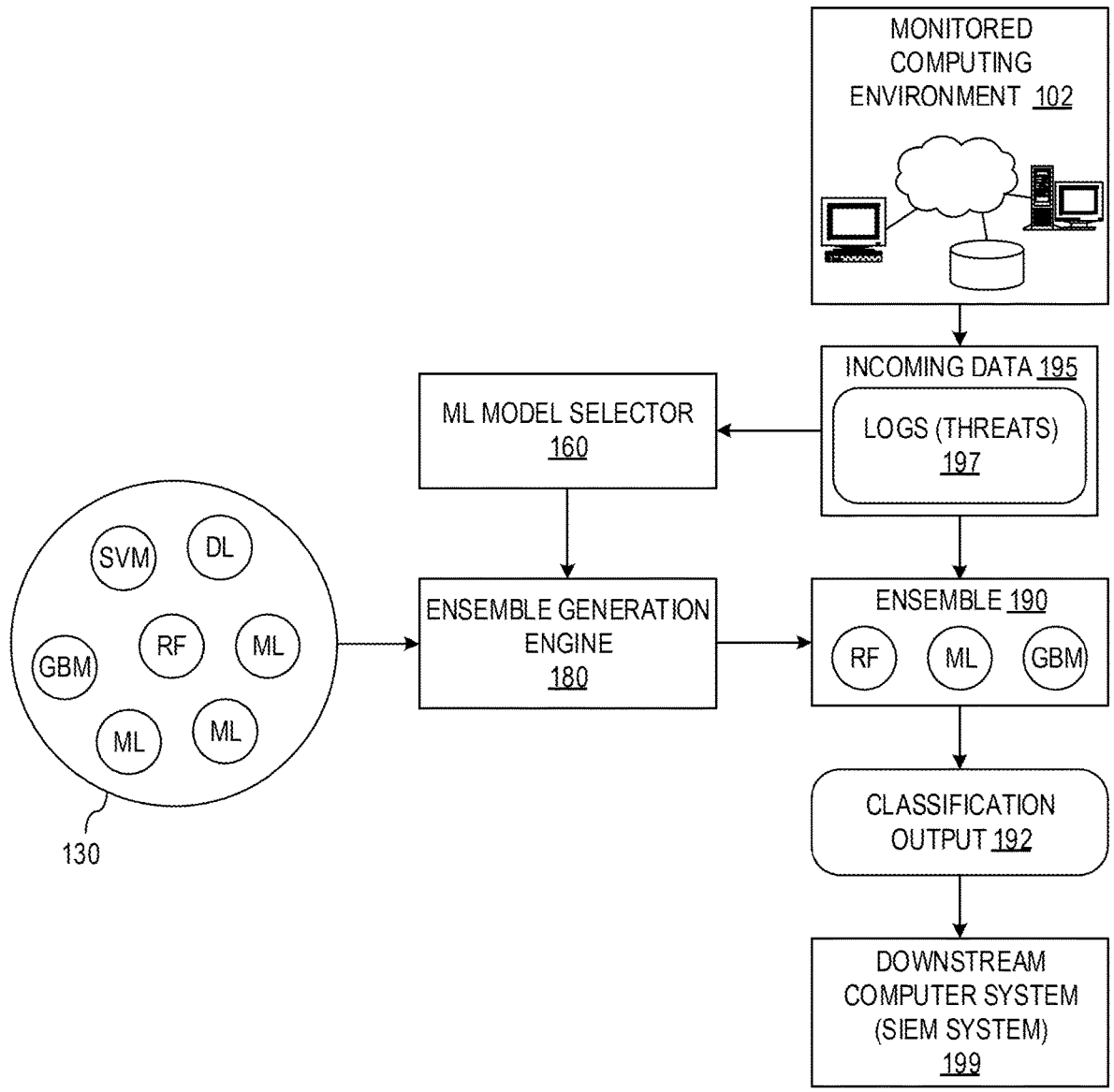
FIG. 2 is an example block diagram illustrating an operation of a trained machine learning (ML) model selector during runtime operation when processing a new input log data structure in accordance with one illustrative embodiment.

The log data is processed by the ML model selector 160 of the ML model selector and ensemble generation (MLM-SEG) system 530 in the manner previously described above with regard to one or more illustrative embodiments, such as described in conjunction with FIG. 2, to select ML models that are best suited for processing the logs within the log data received from the monitored computing system environment 520. The selection of ML models by the ML model selector 160 is provided to the ensemble generation engine 180 of the MLMSEG system 530 which generates an ensemble of ML models based on the selected ML models indicated by the ML model selector 160. The log data is then processed by the ensemble of ML models to generate a classification output which is provided to the SIEM system 540.

For example, the log data, which is unstructured log data from the various computing resources of the monitored computing environment 520, e.g., server 506, storage system 508, clients 510-514, and/or the like, is parsed and feature engineering is performed to generate encoded data frames of log data. These encoded data frames of log data are input to the ensemble of ML models, such as ensemble of ML models 190 in FIG. 1, where the plurality of ML models operate on the encoded data frames to generate anomaly scores indicating whether the particular ML model classifies the encoded data frame as anomalous or not anomalous. These individual model scores are then combined by the ensemble logic to generate an anomaly score for the encoded data frame indicative of a classification of the log data, e.g., CLOSE or ESCALATE. This classification is provided to the SIEM system 540 which then performs a responsive action based on the classification, e.g., outputting a notification user interface, initiating automated responsive actions by other computing systems, or the like.

It should again be appreciated that this ML model selection and generation of an ensemble of ML models is performed dynamically for each incoming log data structure received from the monitored computing system environment. Thus, for a first log data structure, the ensemble may comprise a first subset of ML models, while for a second log data structure, the dynamically generated ensemble may comprise a second subset of ML models where at least one of these ML models may be different from the first subset of ML models. The selection of which ML models to include in the ensemble is based on the relative rankings of the ML models as determined based on the training of the ML models and the accuracy, confidence, and risk associated with the ML model predictions with regard to particular types of logs. Moreover, the selection is based on which particular types of logs are present in the incoming log data structure and their classification into one of a plurality of classes of logs determined based on the relative rankings of ML models. Thus, a dynamic mechanism for dynamically selecting the ML models providing the highest accuracy, with the highest confidence, and lowest risks associated with misprediction, based on the particular types of logs present in the incoming log data structures, is provided. This is a distinct improvement over other mechanisms which use a statically determined ML model and/or static ensemble of ML models that are applied to all log data structures regardless of what types of logs may be present in the log data structures.

As noted above, the mechanisms of the illustrative embodiments utilize specifically configured computing devices, or data processing systems, to perform the operations for anomaly detection based on a hybrid machine learning model mechanism and methodology. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java' programming system, may run in conjunction with the operating system and provides calls to the operating system from Java™ programs or applications executing on data processing system 600.

As a server, data processing system 600 may be, for example, an IBM eServer™ System p® computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the dynamic ML model selector and ensemble generation system 530 in FIG. 5.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

The illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the memory comprising instructions executed by the at least one processor to cause the at least one processor to execute the method comprising:

training a set of machine learning models based on a first training dataset to generate a plurality of trained machine learning models;

executing the set of trained machine learning models on a second training dataset to generate a corresponding output for a set of data instances in the second training dataset;

generating, for each data instance in the set of data instances, a corresponding ranking of machine learning models in the set of machine learning models based on the corresponding output for the data instance generated by the machine learning models in the set of machine learning models;

training a machine learning model selector, based on the set of data instances in the second training dataset and the corresponding ranking of machine learning models for each of the data instances in the set of data instances, to select a trained machine learning model, from the set of trained machine learning models, based on an input data instance; and selecting, by the machine learning model selector, for a new input data instance, a trained machine learning model from the set of trained machine learning models.

2. The method of claim 1, wherein generating, for each data instance in the set of data instances, the corresponding ranking of machine learning models comprises, for each data instance in the set of data instances, and each trained machine learning model in the set of trained machine learning models:

processing the data instance as an input to the trained machine learning model to generate a classification output comprising a classification and an associated confidence value; and generating a ranking score of the trained machine learning model based on a function of the classification and the associated confidence value, wherein the ranking of machine learning models for the data instance is generated based on a comparison of the ranking scores of each of the trained machine learning models for the data instance.

3. The method of claim 2, wherein the ranking score of the trained machine learning model is further generated based on a function of a risk of misprediction indicative of a security risk if a corresponding classification is incorrect.

4. The method of claim 1, further comprising generating a plurality of machine learning model classes based on results of generating, for each data instance in the set of data instances, the corresponding ranking of machine learning models, and wherein the trained machine learning model is selected from the set of trained machine learning models based on a classification of the new input data instance into a machine learning model class in the plurality of machine learning model classes.

5. The method of claim 4, wherein each machine learning model class in the plurality of machine learning model classes comprises one or more data instances for which a same corresponding machine learning model is a highest ranking machine learning model.

6. The method of claim 1, wherein selecting, for the new input data instance, the trained machine learning model from the set of trained machine learning models, to process the new input data instance comprises selecting a subset of two or more trained machine learning models from the set of trained machine learning models for inclusion in an ensemble of trained machine learning models.

7. The method of claim 6, further comprising generating the ensemble of trained machine learning models based on the selection of the subset of two or more trained machine learning models and logic configured to combine outputs of the two or more trained machine learning models to generate a single classification output of the ensemble.

8. The method of claim 1, wherein the selection of the trained machine learning model is performed dynamically for each new input data instance in a plurality of different new input data instances, in response to receiving each new input data instance, and wherein for at least two new input data instances, the selected trained machine learning models for the at least two new input data instances are different from one another.

9. The method of claim 1, further comprising:
processing, by the selected trained machine learning model, the new input data instance to generate a classification output classifying the new input data instance into one of a plurality of predetermined classifications;
outputting, by the selected trained machine learning model, the classification output to a security information and event management (SIEM) computing system; and
performing, by the STEM computing system, a security operation based on the classification output.

10. The method of claim 1, wherein the new input data instance is a security log in a plurality of security logs of a security log data structure obtained from a monitored computing system environment, and wherein the trained machine learning models in the plurality of trained machine learning models are trained to classify security logs as either CLOSE or ESCALATE.

11. A computer program product comprising a non-transitory computer readable storage medium having a computer readable program stored therein, wherein the computer readable program, when executed on a computing device, causes the computing device to:
train a set of machine learning models based on a first training dataset to generate a plurality of trained machine learning models;
execute the set of trained machine learning models on a second training dataset to generate a corresponding output for a set of data instances in the second training dataset;
generate, for each data instance in the set of data instances, a corresponding ranking of machine learning models in the set of machine learning models based on the corresponding output for the data instance generated by the machine learning models in the set of machine learning models;
train a machine learning model selector, based on the set of data instances in the second training dataset and the corresponding ranking of machine learning models for each of the data instances in the set of data instances, to select a trained machine learning model, from the set of trained machine learning models, based on an input data instance; and
select, by the machine learning model selector, for a new input data instance, a trained machine learning model from the set of trained machine learning models.

12. The computer program product of claim 11, wherein the computer readable program further causes the computing device to generate, for each data instance in the set of data instances, the corresponding ranking of machine learning models at least by, for each data instance in the set of data instances, and each trained machine learning model in the set of trained machine learning models:
processing the data instance as an input to the trained machine learning model to generate a classification output comprising a classification and an associated confidence value; and
generating a ranking score of the trained machine learning model based on a function of the classification and the associated confidence value, wherein the ranking of machine learning models for the data instance is generated based on a comparison of the ranking scores of each of the trained machine learning models for the data instance.

13. The computer program product of claim 12, wherein the ranking score of the trained machine learning model is further generated based on a function of a risk of misprediction indicative of a security risk if a corresponding classification is incorrect.

14. The computer program product of claim 11, wherein the computer readable program further causes the computing device to generate a plurality of machine learning model classes based on results of generating, for each data instance in the set of data instances, the corresponding ranking of machine learning models, and wherein the trained machine learning model is selected from the set of trained machine learning models based on a classification of the new input data instance into a machine learning model class in the plurality of machine learning model classes.

15. The computer program product of claim 14, wherein each machine learning model class in the plurality of machine learning model classes comprises one or more data instances for which a same corresponding machine learning model is a highest ranking machine learning model.

16. The computer program product of claim 11, wherein the computer readable program further causes the computing device to select, for the new input data instance, the trained machine learning model from the set of trained machine learning models, to process the new input data instance at least by selecting a subset of two or more trained machine learning models from the set of trained machine learning models for inclusion in an ensemble of trained machine learning models.

17. The computer program product of claim 16, wherein the computer readable program further causes the computing device to generate the ensemble of trained machine learning models based on the selection of the subset of two or more trained machine learning models and logic configured to combine outputs of the two or more trained machine learning models to generate a single classification output of the ensemble.

18. The computer program product of claim 11, wherein the selection of the trained machine learning model is performed dynamically for each new input data instance in a plurality of different new input data instances, in response to receiving each new input data instance, and wherein for at least two new input data instances, the selected trained machine learning models for the at least two new input data instances are different from one another.

19. The computer program product of claim 11, wherein the computer readable program further causes the computing device to:
process, by the selected trained machine learning model, the new input data instance to generate a classification output classifying the new input data instance into one of a plurality of predetermined classifications;
output, by the selected trained machine learning model, the classification output to a security information and event management (SIEM) computing system; and perform, by the STEM computing system, a security operation based on the classification output.

20. An apparatus comprising:

a processor; and a memory coupled to the processor, wherein the memory comprises instructions which, when executed by the processor, cause the processor to:

train a set of machine learning models based on a first training dataset to generate a plurality of trained machine learning models;

execute the set of trained machine learning models on a second training dataset to generate a corresponding output for a set of data instances in the second training dataset;

generate, for each data instance in the set of data instances, a corresponding ranking of machine learning models in the set of machine learning models based on the corresponding output for the data instance generated by the machine learning models in the set of machine learning models;

train a machine learning model selector, based on the set of data instances in the second training dataset and the corresponding ranking of machine learning models for each of the data instances in the set of data instances, to select a trained machine learning model, from the set of trained machine learning models, based on an input data instance; and select, by the machine learning model selector, for a new input data instance, a trained machine learning model from the set of trained machine learning models.

* * * * *